Aug. 5, 1941.  F. C. HILL  2,251,842
CORN SHELLER
Filed June 2, 1939
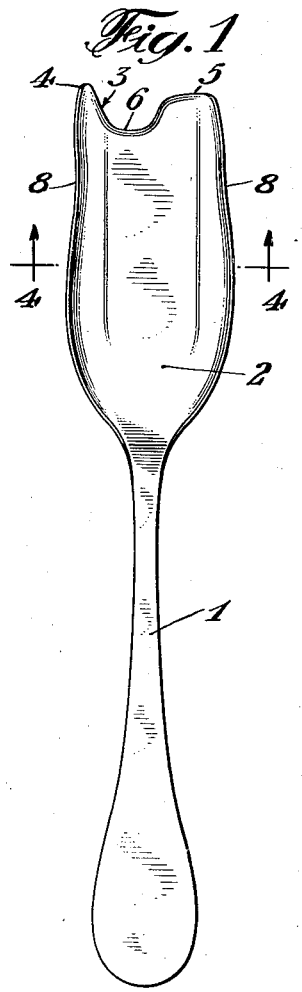
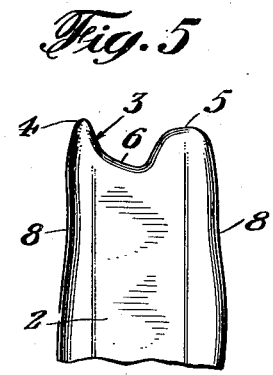
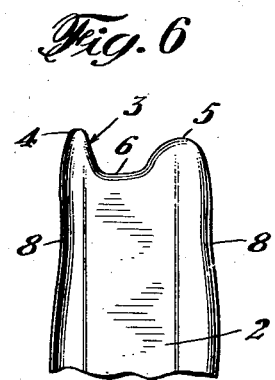
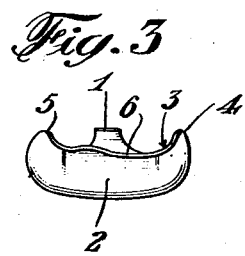
INVENTOR
F.C. Hill
BY
A. A. Smith
ATTORNEY Patented Aug. 5, 1941

2,251,842

UNITED STATES PATENT OFFICE 2,251,842

CORN SHELLER

Fred C. Hill, Freeport, Maine

Application June 2, 1939, Serial No. 276,948

5 Claims. (Cl. 30—149)

This invention relates generally to an article of tableware and more particularly to a device for shelling and removing corn from the cob without the usual embarrassing inconvenience and untidiness. The usual method of eating corn on the cob involves either biting the corn with one's teeth or using a knife to cut the corn from the cob and then eating the same with the customary forms of tableware. When a person relies upon his natural teeth for the purpose of removing corn from the cob, he is exposed to embarrassing discomfort and untidiness since this method is crude at its best. Furthermore, the persons finds that the corn hulls lodge between the teeth, causing actual discomfort in some cases and at least a certain amount of untidiness within and around the mouth. It is also true that people who are compelled to rely upon artificial teeth find great difficulty in trying to remove corn from the cob by means of the artificial teeth and in most cases it is utterly impossible to eat corn on the cob when a person has lost his natural teeth.

Accordingly, the principal object of this invention is to provide an article of tableware for the purpose of removing corn from the cob with convenience and neatness.

Another object of this invention is to provide an article of tableware for aiding and facilitating the removal of corn from the cob and conveying it to the mouth.

Still another object of this invention is to provide a device for shelling and removing corn from the cob and also to convey the same to the mouth without the usual discomfort and embarrassing untidiness.

A further object of this invention is to provide an article of tableware which is so formed that removal of inedible portions of the cob and maceration of kernels in rows adjacent to those being shelled is avoided.

Further objects and advantages of this invention will be apparent to those skilled in the art from an inspection of the following description taken in connection with the drawing wherein:

Fig. 1 is a plan view of a corn shelling device;

Fig. 2 is a side view and also shows a partial section of the corn sheller shown in Fig. 1;

Fig. 3 is an end view showing the shelling edge and the contour of the corn shelling device;

Fig. 4 is a section taken on line 4—4 of Fig. 1;

Fig. 5 is a fragmentary view of a modification of this invention showing a modified shelling edge; and Fig. 6 shows another modification of the form which the shelling edge may take.

Fig. 1 of the drawing shows the preferred modification of this invention which comprises a handle portion 1 with the bowl 2 attached thereto or integral therewith and formed as shown in the drawing. In accordance with the objects of this invention the bowl 2 is provided with a substantially S-shaped shelling edge 3 which bounds a guiding portion 4, a throat 6, and a second wider guiding portion 5. As clearly shown in Fig. 3, the shelling edge is not sharp but is slightly dull in order to accomplish a shelling function rather than a cutting function. The thickness or dullness of edge 3 is exaggerated in the drawing for purposes of illustration and is intended to be a dulled edge suitable for accomplishing a shelling function. Fig. 3 also illustrates that the shelling edge is continuous from one side of the bowl to the other whereby one or more rows of corn may be shelled at one stroke of the implement along the ear. In use, the guiding portions 4 and 5 serve to lead the implement along the rows of kernels on the cob while the throat portion 6 actually serves to do the greater share of the shelling.

In the prior art it is found that most corn shelling devices are formed in the shape of a spoon but this is found to cause maceration of unshelled kernels adjacent the sides of the spoon because of its flaring side portions. In accordance with this invention, the bowl of the device is streamlined in that the edges or sides 8 of the bowl are hollowed or cut inwardly, slightly, toward the center line whereby maceration of adjacent kernels is avoided. This shape also facilitates the eating process and reduces discomfort when the device is inserted and removed from the mouth of the user.

Fig. 2 illustrates the proportions which are found to be most advantageous both in regard to thickness of the cutting edge and to the depth of the bowl portion itself. Figs. 3 and 4 show the desired proportions and shapes of the bowl 2 by an end view as well as by a section taken at 4—4 in Fig. 1.

Fig. 5 illustrates a further modification of this invention wherein the guiding portions 4 and 5, together with the throat 6, have been altered in outline and may be found to more efficiently shell or remove certain varieties of corn as well as to satisfy the individual tastes of particular users.

Fig. 6 illustrates still another form of shelling edge and guiding parts which may be more adaptable to different varieties of corn than the other two modifications. Furthermore, the individual likes and dislikes of different persons usually require that several different forms of shelling edge be available since one person can utilize one form with more ease and efficiency than another.

The preferred method of utilizing the corn sheller is to insert the guide portion 4 between two adjacent rows of kernels on the cob and then to push the sheller along the row, shelling and removing the kernels, until the bowl is filled to the satisfaction of the user. After a single row is removed, two or more rows may be removed at a time, depending upon the personal preference of the user.

From the above description and the accompanying drawing it is evident that this invention provides an improved corn shelling device which shells rather than cuts corn from the cob, thereby avoiding removal of inedible portions of the cob and preventing consumption of the same. It is also evident that this device can be used with convenience and neatness for shelling corn from the cob without maceration or other disturbance of the adjacent kernels on the cob. The corn-sheller provided with proportions shown on the drawing also results in a safe, efficient, and neat device for collecting the kernels of corn after they have been shelled and eating the same without the danger of spilling or other embarassing inconvenience and untidiness.

Further modifications of this invention will occur to those skilled in the art and therefore I desire to be limited to the specific devices shown in the drawing only insofar as is required by the prior art and the scope of the appended claims.

I claim:

1. A corn shelling instrument comprising a handle adapted for manual use and a bowl-shaped portion comprising a body the end of which has a prong at one side adapted to guide the instrument along the rows of kernels on an ear of corn, a recessed shelling edge for engaging and shelling the kernels of corn and a broad guiding portion at the other side of said bowl having a continuation of said shelling edge.

2. A corn shelling implement comprising a handle portion and a bowl attached thereto, said bowl including a food collecting portion and a food detaching portion, the food detaching portion comprising a throat having a dulled shelling edge, a narrow guide at one side of said throat having a continuation of said shelling edge and a wider guide at the other side of said throat having a further continuation of said shelling edge.

3. A corn shelling implement comprising a handle and a streamlined bowl portion, said bowl including a substantially S-shaped shelling edge at one end thereof which forms guides for leading the implement along the rows of kernels on an ear of corn, said bowl also including a narrowed portion in proximity to the shelling edge whereby unshelled kernels of corn are not macerated during the shelling of adjacent kernels.

4. A corn shelling implemenet comprising a handle and a streamlined bowl portion, said bowl including a shelling edge at one end thereof, the longitudinal edges of said bowl receding slightly toward the center line of the bowl in proximity to the shelling edge whereby maceration of unshelled corn is avoided.

5. A corn shelling implement comprising a handle and a bowl portion, said bowl including a substantially S-shaped shelling edge at one end thereof, said bowl comprising an elongated body the maximum width of which is substantially equal to the width at the cutting edge whereby maceration of corn is prevented.

FRED C. HILL.